US012621831B2

(12) United States Patent 
Lindoff et al.

(10) Patent No.: US 12,621,831 B2 
(45) Date of Patent: May 5, 2026

(54) CLIENT DEVICE AND NETWORK ACCESS NODE FOR MANAGEMENT OF CCH MONITORING CAPABILITIES

(71) Applicant: HUAWEI TECHNOLOGIES CO., LTD., Shenzhen (CN)

(72) Inventors: Bengt Lindoff, Lund (SE); Thorsten Schier, Lund (SE); Fei Gao, Shanghai (CN); Yan Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 367 days.

(21) Appl. No.: 17/941,414

(22) Filed: Sep. 9, 2022

(65) Prior Publication Data

US 2023/0007644 A1 Jan. 5, 2023

Related U.S. Application Data

(63) Continuation of application No. PCT/CN2020/084039, filed on Apr. 9, 2020.

(51) Int. Cl.
*H04W 72/20* (2023.01)
*H04W 8/24* (2009.01)

(52) U.S. Cl.
CPC ............. *H04W 72/20* (2023.01); *H04W 8/24* (2013.01)

(58) Field of Classification Search
CPC ....... H04W 72/20; H04W 8/24; H04W 24/08; H04L 5/0064; H04L 5/0053; H04L 5/001
See application file for complete search history.

(56) References Cited

U.S. PATENT DOCUMENTS

2018/0324778 A1    11/2018  Farajidana et al.
2019/0306737 A1*  10/2019  Kwak ................... H04L 5/0053
(Continued)

FOREIGN PATENT DOCUMENTS

JP          2019047412 A      3/2019
WO        2018204886 A1    11/2018
(Continued)

OTHER PUBLICATIONS

R1-2000735 (IDS cited) (Year: 2020).*
(Continued)

*Primary Examiner* — Yemane Mesfin
*Assistant Examiner* — Guoxing Fan
(74) *Attorney, Agent, or Firm* — HAUPTMAN HAM, LLP

(57) ABSTRACT

A client device, a network access node for management of control channel monitoring capabilities and corresponding methods and computer program are described. The client device transmits a first control message to the network access node to inform the network access node about its CCH monitoring capabilities. The first control message indicates a set of CCH monitoring capabilities supported by the client device; each CCH monitoring capability in the set indicates a first CCH monitoring capability for a first CCH monitoring mode and a second CCH monitoring capability for a second CCH monitoring mode. Based on the first control message, the network access node can determine a CCH monitoring capability from the set of CCH monitoring capabilities for the client device and configure the client device with the determined CCH monitoring capability. Thereby, flexible CCH monitoring which can be adapted to different service requirements and traffic situations is provided.

18 Claims, 4 Drawing Sheets

(56)                    References Cited

U.S. PATENT DOCUMENTS

| | | | |
|---|---|---|---|
| 2019/0394772 A1 | 12/2019 | Li et al. | |
| 2020/0329389 A1* | 10/2020 | Hosseini | H04L 5/0091 |
| 2021/0385679 A1* | 12/2021 | Hosseini | H04W 72/23 |

FOREIGN PATENT DOCUMENTS

| | | | |
|---|---|---|---|
| WO | 2020209953 A1 | 10/2020 | |
| WO | 2021067099 A1 | 4/2021 | |

OTHER PUBLICATIONS

R1-1911118 (IDS cited) (Year: 2019).*
R1-1812815 (IDS cited) (Year: 2018).*
R1-1912511 (IDS cited) (Year: 2019).*
MediaTek Inc., PDCCH enhancements for eURLLC [online], 3GPP TSG RAN WG1 #99 R1-1912116, Internet URL: https://www.3gpp.org/ftp/tsg_ran/WG1_RL1/TSGR1_99/Docs/R1-1912116.zip>, Nov. 9, 2019 ,total:12pages.
Intel Corporation, Remaining aspects on Rel-16 PDCCH enhancements for URLLC [online], 3GPP TSG RAN WG1 #100_e R1-2000735, Internet URL:https://www.3gpp.org/ftp/tsg_ran/WG1_RL1/TSGR1_100_e/Docs/R1-2000735.zip>, Feb. 15, 2020,total:26pages.
Japanese Office Action issued in corresponding Japanese Application No. 2022-555786, dated Sep. 5, 2023, pp. 1-15.
R1-1911118, Qualcomm Incorporated et al., PDCCH Enhancements for eLTRLLC, 3GPP TSG-RAN WG1 Meeting #98b Oct. 14-20, 2019, Chongqing, China, total 14 pages.
R1-1812815, OPPO, PDCCH enhancement for URLLC, 3GPP TSG RAN WG1 Meeting #95, Spokane, USA, Nov. 12-16, 2018, 4 pages.
3GPP TS 38.213 V16.1.0 (Mar. 2020), 3rd Generation Partnership Project;Technical Specification Group Radio Access Network;NR;Physical layer procedures for control(Release 16), 156 pages.
R1-1912511, Nokia, Nokia Shanghai Bell et al., On PDCCH Enhancements for NR URLLC, 3GPP TSG RAN WG1#99, Reno, NV, USA, Nov. 18-22, 2019, total 23 pages.
3GPP TS 38.331 V15.5.0 (Mar. 2019), 3rd Generation Partnership Project;Technical Specification Group Radio Access Network;NR; Radio Resource Control (RRC) protocol specification(Release 15), 491 pages.
R1-2000735, Intel Corporation et al., Remaining aspects on Rel-16 PDCCH enhancements for URLLC, 3GPP TSG RAN WG1 #100-E,e-Meeting, Feb. 24-Mar. 6, 2020, total 20 pages.
3GPP TR 38.822 V15.0.1 (Jul. 2019), 3rd Generation Partnership Project;Technical Specification Group Radio Access Network;NR;User Equipment (UE) feature list(Release 15), 64 pages.
International Search Report issued in corresponding International Application No. PCT/CN2020/084039, dated Dec. 30, 2020, pp. 1-8.
Extended European Search Report issued in corresponding European Application No. 20930546.5, dated Mar. 7, 2023, pp. 1-14.

* cited by examiner

100

200

300

400

CLIENT DEVICE AND NETWORK ACCESS NODE FOR MANAGEMENT OF CCH MONITORING CAPABILITIES

CROSS-REFERENCE TO RELATED APPLICATIONS

This application is a continuation of International Application No. PCT/CN2020/084039, filed on Apr. 9, 2020, the disclosure of which is hereby incorporated by reference in its entirety.

TECHNICAL FIELD

The instant disclosure relates to a client device and a network access node for management of control channel (CCH) monitoring capabilities. Furthermore, the instant disclosure also relates to corresponding methods and computer program.

BACKGROUND

3GPP new radio (NR) is designed for a variety of use cases, in particular enhanced mobile broadband (eMBB) and ultra reliable low latency (URLLC) communication services.

One important feature to meet the diverse requirements of mobile communication is carrier aggregation, where several carriers or serving cells can be used for transmission. Carrier aggregation can provide higher data rates and/or more reliability over the communication link. However, in order to provide an efficient usage of carrier aggregation, it should be possible to easily adapt the carrier aggregation configuration to different characteristics and requirements of different NR services, such as eMBB and URLLC.

SUMMARY

An objective of one or more embodiments of the instant disclosure is to provide a solution which mitigates or solves one or more of the drawbacks and problems of other approaches.

According to a first aspect of some embodiments, one or more of the above mentioned and other objectives are achieved with a client device for a communication system, the client device being configured to transmit a first control message to a network access node, wherein the first control message indicates a set of control channel, CCH, monitoring capabilities supported by the client device, wherein each CCH monitoring capability in the set of CCH monitoring capabilities indicates a first CCH monitoring capability for a first CCH monitoring mode and a second CCH monitoring capability for a second CCH monitoring mode.

Monitoring capability may be further denoted monitoring capability information which implies information content about the supported monitoring CCH capability of the client device.

It is to be understood that the client device may transmit one or more first control messages to the network access node and hence not limited to a single first control message. The one or more first control messages may be transmitted in a single transmission or in plurality of transmissions to the network access node.

An advantage of the client device according to the first aspect of some embodiments is that it can support diverse communication scenarios with widely different characteristics and requirements. Especially, in carrier aggregation efficient usage and adaption of capabilities is crucial. Such a mechanism is herein provided. For example, the client device can be designed to support a set of CCH monitoring capability pairs, and by sending the control message to the network access node the client device indicates/informs the network about this supported set. Based on this information the network can select the CCH monitoring capability pair from the indicated set that is most suitable for a given use case, and if the use case changes, the network can select another CCH monitoring capability pair from the supported set. By doing so it will be ensured that the network access node and the client device can adapt to the requirements of a given communication service, such as eMBB and URLLC.

In an implementation form of a client device according to the first aspect of some embodiments, the first CCH monitoring capability is associated with a first number of serving cells and the second CCH monitoring capability is associated with a second number of serving cells.

Serving cells can also be understood to be cells, activated cells, component carriers, carriers, bandwidth parts, active bandwidth parts, etc.

An advantage with this implementation form in accordance with some embodiments is that mixed services can be supported efficiently by the client device. For example, URLLC can be monitored with monitoring mode M2 and eMBB with monitoring mode M1, or vice versa. Since the traffic loads for the two services can change over time the CCH monitoring capability can be adopted to such changes.

In an implementation form of a client device according to the first aspect of some embodiments, in the first monitoring mode the client device is configured to perform CCH monitoring on a slot basis by monitoring a maximum number of resources in a time slot and in the second monitoring mode the client device is configured to perform CCH monitoring on a per span basis by monitoring a maximum number of resources in a sub-slot. The maximum number of resources may be understood as physical resources and/or computational resources.

The first monitoring mode may correspond to the monitoring on slot basis as defined in release 15 of the 3GPP standard and the second monitoring mode may correspond to the monitoring per span basis as defined in release 16 of the 3GPP standard.

In an implementation form of a client device according to the first aspect of some embodiments, a maximum number of CCH candidates and a maximum number of non-overlapping control channel elements, CCEs, per serving cell for CCH monitoring are dependent on a combination of a first CCH monitoring capability and a second CCH monitoring capability.

Each CCH candidate can be associated with a downlink control information (DCI) format of a specific size which may be transmitted on a predefined combination of time and/or frequency resources. If these DCI formats have different sizes they may be counted as separate CCH candidates, and if they have the same size they may be counted as one CCH candidate.

An advantage with this implementation form in accordance with some embodiments is that even more flexibility on the supported number of CCH monitoring capability pairs can be given.

In an implementation form of a client device according to the first aspect of some embodiments, the first control message indicates: explicitly the set of CCH monitoring capabilities; one or more indices, each index being associated with one or more CCH monitoring capabilities; only each first CCH monitoring capability; or a single CCH monitoring capability.

An advantage with this implementation form in accordance with some embodiments is that a number of different ways of control signalling is presented with its advantages. For example, explicit signalling means full flexibility, and the client device can explicitly report what combinations it can support. By reporting one or more indices still some signalling flexibility is provided and may reduce signalling overhead compared to the explicit signalling approach. Further, by indicating only each first CCH monitoring capability, or a single CCH monitoring capability in the set of CCH monitoring capabilities, very low signalling overhead will be needed.

In an implementation form of a client device according to the first aspect of some embodiments, the client device is further configured to obtain a CCH monitoring capability from the set of CCH monitoring capabilities; and perform CCH monitoring based on the obtained CCH monitoring capability.

An advantage with this implementation form in accordance with some embodiments is that the client device knows which supported CCH monitoring capability should be used for CCH monitoring.

In an implementation form of a client device according to the first aspect of some embodiments, the obtaining of the CCH monitoring capability comprises: receive a second control message from the network access node, wherein the second control message indicates a CCH monitoring capability from the set of CCH monitoring capabilities; and obtain the CCH monitoring capability based on the second control message.

An advantage with this implementation form in accordance with some embodiments is that is that the client device knows via control signaling from the network access node which supported CCH monitoring capability should be used by the client device.

In an implementation form of a client device according to the first aspect of some embodiments, the second control message is any of: a radio resource control message, a medium access control channel element, or a downlink control information.

An advantage with this implementation form in accordance with some embodiments is that it gives flexibility to convey the second control message in different layers. Having it at higher layers would typically reduce the signalling load over the air-interface but would offer less flexibility for fast re-configuration, whereas having on the physical layer in downlink control information, it would give more flexibility. It can also be considered to have the signalling in medium access control (MAC) channel element (CE) and in downlink control information (DCI) where the DCI could override the MAC CE since MAC CE is semi-statically configured while DCI is dynamically signalled.

In an implementation form of a client device according to the first aspect of some embodiments, the obtaining of the CCH monitoring capability comprises: determine a set of cell configurations for the client device, wherein at least one cell configuration in the set of cell configurations comprises the first CCH monitoring mode or the second CCH monitoring mode; and obtain the CCH monitoring capability based on the set of cell configurations for the client device.

An advantage with this implementation form in accordance with some embodiments is that no explicit control signaling for the capability information is needed which reduces overhead.

According to a second aspect of some embodiments, one or more of the above mentioned and other objectives are achieved with a network access node for a communication system, the network access node being configured to receive a first control message from a client device, wherein the first control message indicates a set of CCH monitoring capabilities supported by the client device, wherein each CCH monitoring capability in the set of CCH monitoring capabilities indicates a first CCH monitoring capability for a first CCH monitoring mode and a second CCH monitoring capability for a second CCH monitoring mode; determine a CCH monitoring capability from the set of CCH monitoring capabilities for the client device based on the first control message; and configure the client device with the determined CCH monitoring capability.

An advantage of the network access node according to the second aspect of some embodiments is that it can support diverse communication scenarios with widely different characteristics and requirements. Especially, in carrier aggregation efficient usage and adaption of capabilities is crucial. Such a mechanism is herein provided. For example, the client device can be designed to support a set of CCH monitoring capability pairs, and by sending the control message to the network access node the client device indicates/informs the network about this supported set. Based on this information the network can select the CCH monitoring capability pair from the indicated set that is most suitable for a given use case, and if the use case changes, the network can select another CCH monitoring capability pair from the supported set. By doing so it will be ensured that the network access node and the client device can adapt to the requirements of a given communication service, such as eMBB and URLLC.

In an implementation form of a network access node according to the second aspect of some embodiments, the first CCH monitoring capability is associated with a first number of serving cells and the second CCH monitoring capability is associated with a second number of serving cells.

An advantage with this implementation form in accordance with some embodiments is that mixed services can be supported efficiently by the client device. For example, URLLC can be monitored with monitoring mode M2 and eMBB with monitoring mode M1, or vice versa. Since the traffic loads for the two services can change over time the CCH monitoring capability can be adopted to such changes.

In an implementation form of a network access node according to the second aspect of some embodiments, a maximum number of CCH candidates and a maximum number of non-overlapping CCEs per serving cell for CCH monitoring are dependent on a combination of a first CCH monitoring capability and a second CCH monitoring capability.

An advantage with this implementation form in accordance with some embodiments is that even more flexibility on the supported number of CCH monitoring capability pairs can be given.

In an implementation form of a network access node according to the second aspect of some embodiments, the first control message indicates: explicitly the set of CCH monitoring capabilities; one or more indices, each index being associated with one or more CCH monitoring capabilities; only each first CCH monitoring capability; or a single CCH monitoring capability.

An advantage with this implementation form in accordance with some embodiments is that a number of different ways of control signalling is presented with its advantages.

For example, explicit signalling means full flexibility, and the client device can explicitly report what combinations it can support. By reporting one or more indices still some signalling flexibility is provided and may reduce signalling overhead compared to the explicit signalling approach. Further, by indicating only each first CCH monitoring capability, or a single CCH monitoring capability in the set of CCH monitoring capabilities very low signalling overhead will be needed.

In an implementation form of a network access node according to the second aspect of some embodiments, the determining of the CCH monitoring capability from the set of CCH monitoring capabilities comprises determine the CCH monitoring capability based on the set of CCH monitoring capabilities and at least one of: cell load, supported number of carriers, supported services, and configured services for the client device.

An advantage with this implementation form in accordance with some embodiments is that the network access node and hence the network can take various input parameters into consideration to select the best suited CCH monitoring capability. Without this mechanism the network would not be able to select the best suited CCH monitoring capability, which would lead to degraded performance for services, or in worst case, that the service could not be supported at all.

In an implementation form of a network access node according to the second aspect of some embodiments, the configuring of the client device with the determined CCH monitoring capability comprises transmit a second control message to the client device, wherein the second control message indicates the determined CCH monitoring capability.

An advantage with this implementation form in accordance with some embodiments is that is that the client device knows via control signaling from the network access node which supported CCH monitoring capability should be used by the client device.

In an implementation form of a network access node according to the second aspect of some embodiments, the second control message is any of: a radio resource control message, a medium access control channel element, or a downlink control information.

An advantage with this implementation form in accordance with some embodiments is that it gives flexibility to convey the second control message in different layers. Having it at higher layers would typically reduce the signalling load over the air-interface but would offer less flexibility for fast re-configuration, whereas having on the physical layer in downlink control information, it would give more flexibility. It can also be considered to have the signalling in medium access control (MAC) channel element (CE) and in downlink control information (DCI) where the DCI could override the MAC CE since MAC CE is semistatically configured while DCI is dynamically signalled.

In an implementation form of a network access node according to the second aspect of some embodiments, the configuring of the client device with the determined CCH monitoring capability comprises determine a set of cell configurations for the client device, wherein at least one cell configuration in the set of cell configurations comprises the first CCH monitoring mode or the second CCH monitoring mode; and configure the client device with the set of cell configurations for the client device.

An advantage with this implementation form in accordance with some embodiments is that no explicit control signaling for the capability information is needed which reduces overhead.

According to a third aspect of some embodiments, one or more of the above mentioned and other objectives are achieved with a method for a client device, the method comprises: transmitting a first control message to a network access node, wherein the first control message indicates a set of control channel, CCH, monitoring capabilities supported by the client device, wherein each CCH monitoring capability in the set of CCH monitoring capabilities indicates a first CCH monitoring capability for a first CCH monitoring mode and a second CCH monitoring capability for a second CCH monitoring mode.

The method according to the third aspect of some embodiments can be extended into implementation forms corresponding to the implementation forms of the client device according to the first aspect of some embodiments. Hence, an implementation form of the method comprises the features of the corresponding implementation form of the client device.

The advantages of the methods according to the third aspect of some embodiments are the same as those for the corresponding implementation forms of the client device according to the first aspect of some embodiments.

According to a fourth aspect of some embodiments, one or more of the above mentioned and other objectives are achieved with a method for a network access node, the method comprises: receiving a first control message from a client device, wherein the first control message indicates a set of CCH monitoring capabilities supported by the client device, wherein each CCH monitoring capability in the set of CCH monitoring capabilities indicates a first CCH monitoring capability for a first CCH monitoring mode and a second CCH monitoring capability for a second CCH monitoring mode; determining a CCH monitoring capability from the set of CCH monitoring capabilities for the client device based on the first control message; and configuring the client device with the determined CCH monitoring capability.

The method according to the fourth aspect of some embodiments can be extended into implementation forms corresponding to the implementation forms of the network access node according to the second aspect of some embodiments. Hence, an implementation form of the method comprises the features of the corresponding implementation form of the network access node.

The advantages of the methods according to the fourth aspect of some embodiments are the same as those for the corresponding implementation forms of the network access node according to the second aspect of some embodiments.

Some embodiments also relate to a computer program, characterized in program code, which when run by at least one processor causes said at least one processor to execute any method according to embodiments of the instant disclosure. Further, some embodiments also relate to a computer program product comprising a non-transitory computer readable medium and said mentioned computer program, wherein said computer program is included in the computer readable medium, and the computer readable medium comprises of one or more from the group of: ROM (Read-Only Memory), PROM (Programmable ROM), EPROM (Erasable PROM), Flash memory, EEPROM (Electrically EPROM), hard disk drive, or the like.

Further applications and advantages of embodiments of the instant disclosure will be apparent from the following detailed description.

BRIEF DESCRIPTION OF THE DRAWINGS

The appended drawings are intended to clarify and explain different embodiments, in which.

DETAILED DESCRIPTION

Figure 1:
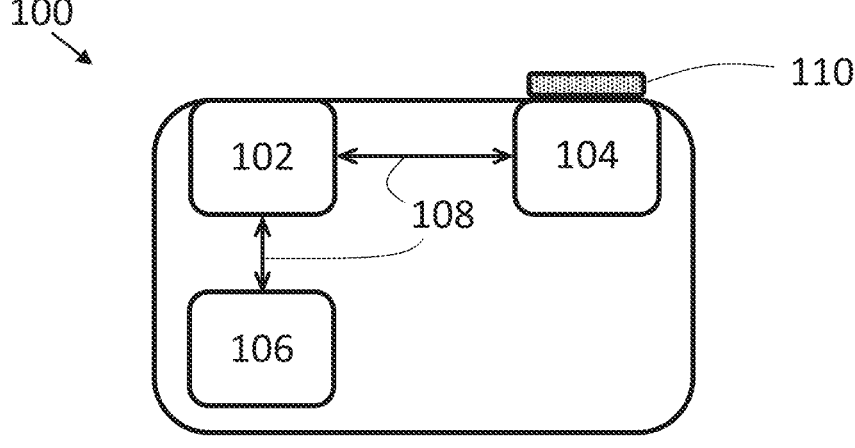
FIG. 1 shows a client device according to at least one embodiment.

In the specification, claims, and the accompanying drawings of this application, the terms "first", "second", and the like are intended to distinguish similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "have" and any variant thereof mean to cover the non-exclusive inclusion, so that a process, method, system, product, or device that includes a series of units is not necessarily limited to those units, but may include other units not expressly listed or inherent to such a process, method, product, or device.

In 3GPP, the user equipment (UE) can report its carrier aggregation (CA) capability to the network. For example, in feature group 6-5, the UE reports the number of supported downlink carriers, which can be up to 16. In feature group 6-5a, the UE is reporting its capability of supported cells for physical downlink control channel (PDCCH) monitoring in case of CA. Because PDCCH monitoring is a very complex operation which is requiring a lot of resources, the UE can be configured with more cells in total than it has PDCCH monitoring capability. This is not an error case. In such a situation, the UE can still operate on all configured cells, but it will, according to pre-defined formulas defined in TS 38.213, scale the PDCCH monitoring.

In release 15 (Rel-15) of the 3GPP standard, there is only one type of PDCCH monitoring (called Rel-15 monitoring in this disclosure). A Rel-15 UE can report how many Rel-15 cells it can support for PDCCH monitoring. The minimum requirement is 4 cells. In release 16 (Rel-16), enhanced PDCCH monitoring is introduced (called Rel-16 monitoring in this disclosure). Rel-16 monitoring is different from Rel-15 monitoring. In Rel-15, the UE has to support a maximum number of non-overlapped control channel elements (CCEs) and maximum number of monitored PDCCH candidates per slot. In Rel-16, the UE has to support a maximum number of non-overlapped control channel elements (CCEs) and monitored PDCCH candidates (or blind decodes) per monitoring span, and there can be several monitoring spans within a slot.

In this discourse the term "blind decodes" can be used interchangeably with "maximum number of PDCCH candidates" and the term "CCEs" can be used interchangeably with "maximum number of non-overlapped CCEs".

The UE can be configured with Rel-15 CCH monitoring in some cells and with Rel-16 CCH monitoring in other cells. The UE can report its Rel-15/Rel-16 monitoring capability independently from each other.

One drawback with one or more other approaches is that the UE only reports one Rel-15 monitoring and one Rel-16 monitoring capability. Rel-15 monitoring is not necessarily worse than Rel-16 monitoring but targeting for different use cases. Rel-15 monitoring could be more suitable for eMBB applications while Rel-16 monitoring could be more applicable for URLLC applications.

Another drawback with the other approaches is that for each sub-carrier spacing and each monitoring span pattern only one value for the maximum number of non-overlapping CCEs, i.e., parameter C_max, and only one value for the maximum number of PDCCH candidates is given, i.e., parameter M_max. However, for different combinations of Rel-15/Rel-16 PDCCH monitoring capability, different values could apply. It is noted that mentioned parameters C_max and M_max are a generic wording for the sub-carrier spacing and span pattern specific parameters $$C_{PDCCH}^{max,slot,\mu}, C_{PDCCH}^{max,(X,Y),\mu}, M_{PDCCH}^{max,slot,\mu}$$

and $$M_{PDCCH}^{max,(X,Y),\mu}$$

which are used in the 3 GPP specifications.

Therefore, it is herein presented a solution with enhanced support and procedures for the exchange of CCH monitoring capability information between a client device and a network access node and further for determining which CCH monitoring capability to use. Thereby, a flexible CCH monitoring mechanism which can be adapted to different service requirements and traffic situations is provided.

FIG. 1 shows a client device 100 according to at least one embodiment. In FIG. 1, the client device 100 comprises a processor 102, a transceiver 104 and a memory 106. The processor 102 may be coupled to the transceiver 104 and the memory 106 by communication means 108, e.g., at least one bus or other devices known in the art. The client device 100 may further comprise an antenna or antenna array 110 coupled to the transceiver 104, which means that the client device 100 may be configured for communications in a communication system.

That the client device 100 may be configured to perform certain actions can in this disclosure be understood to mean that the client device 100 comprises suitable means, such as, e.g., the processor 102 and the transceiver 104, configured to perform said actions.

According to some embodiments, the client device 100 is configured to transmit a first control message 502 to a network access node 300. The first control message 502 indicates a set of control channel (CCH) monitoring capabilities supported by the client device 100. Each CCH monitoring capability in the set of CCH monitoring capabilities indicates a first CCH monitoring capability for a first CCH monitoring mode M1 and a second CCH monitoring capability for a second CCH monitoring mode M2.

Figure 2:
FIG. 2 shows a method for a client device according to at least one embodiment.

FIG. 2 shows a flow chart of a corresponding method 200 which may be executed in a client device 100, such as the one shown in FIG. 1. The method 200 comprises transmitting 202 a first control message 502 to a network access node 300. The first control message 502 indicates a set of CCH monitoring capabilities supported by the client device 100. Each CCH monitoring capability in the set of CCH monitoring capabilities indicates a first CCH monitoring capability for a first CCH monitoring mode M1 and a second CCH monitoring capability for a second CCH monitoring mode M2.

Figure 3:
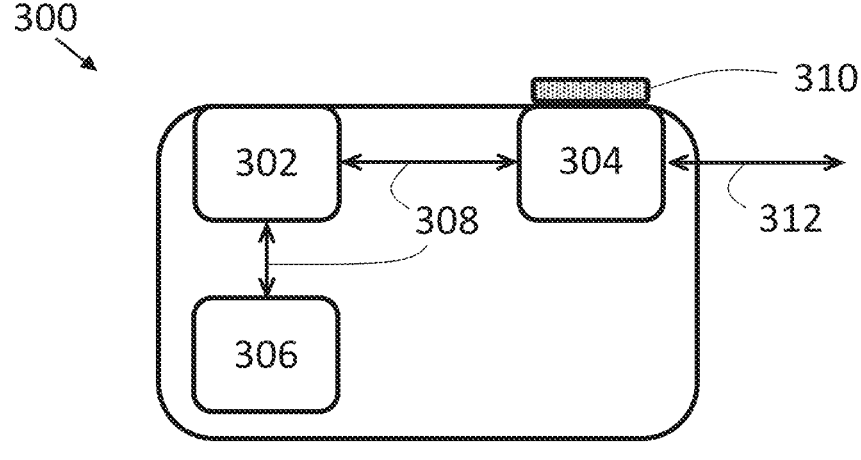
FIG. 3 shows a network access node according to at least one embodiment.

FIG. 3 shows a network access node 300 according to at least one embodiment. In FIG. 3, the network access node 300 comprises a processor 302, a transceiver 304 and a memory 306. The processor 302 is coupled to the transceiver 304 and the memory 306 by communication means 308, e.g., at least one bus or other devices known in the art. The network access node 300 may be configured for both wireless and wired communications in wireless and wired communication systems, respectively. The wireless communication capability is provided with an antenna or antenna array 310 coupled to the transceiver 304, while the wired communication capability is provided with a wired communication interface 312 coupled to the transceiver 304.

That the network access node 300 is configured to perform certain actions can in this disclosure be understood to mean that the network access node 300 comprises suitable means, such as, e.g., the processor 302 and the transceiver 304, configured to perform said actions.

According to some embodiments, the network access node 300 is configured to receive a first control message 502 from a client device 100. The first control message 502 indicates a set of CCH monitoring capabilities supported by the client device 100. Each CCH monitoring capability in the set of CCH monitoring capabilities indicates a first CCH monitoring capability for a first CCH monitoring mode M1 and a second CCH monitoring capability for a second CCH monitoring mode M2. The network access node 300 is further configured to determine a CCH monitoring capability from the set of CCH monitoring capabilities for the client device 100 based on the first control message 502 and configure the client device 100 with the determined CCH monitoring capability.

Figure 4:
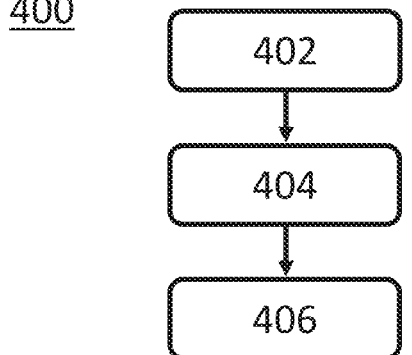
FIG. 4 shows a method for a network access node according to at least one embodiment.

FIG. 4 shows a flow chart of a corresponding method 400 which may be executed in a network access node 300, such as the one shown in FIG. 3. The method 400 comprises receiving 402 a first control message 502 from a client device 100. The first control message 502 indicates a set of CCH monitoring capabilities supported by the client device 100. Each CCH monitoring capability in the set of CCH monitoring capabilities indicates a first CCH monitoring capability for a first CCH monitoring mode M1 and a second CCH monitoring capability for a second CCH monitoring mode M2. The method 200 further comprises determining 404 a CCH monitoring capability from the set of CCH monitoring capabilities for the client device 100 based on the first control message 502 and configuring 406 the client device 100 with the determined CCH monitoring capability.

Figure 5:
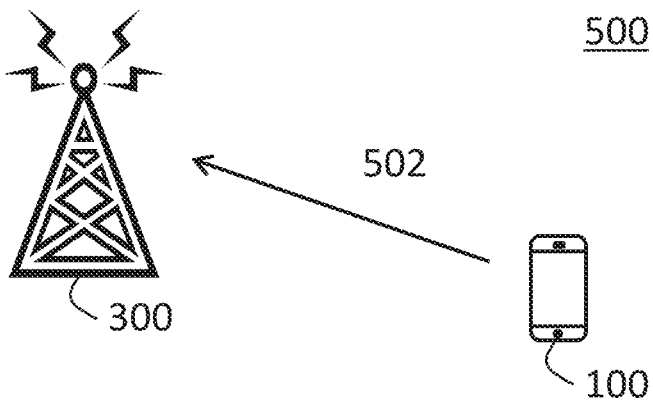
FIG. 5 shows a communication system according to at least one embodiment.

FIG. 5 illustrates a communication system 500 according to some embodiments. The communication system 500 comprises a network access node 300 and a client device 100 configured to operate in the communication system 500. The communication system 500 may support diverse communication services with widely different characteristics and requirements, such as, e.g., eMBB and URLLC services. To efficiently support the diverse communication services two different CCH monitoring modes may be used in the communication system 500, i.e., a first CCH monitoring mode M1 and a second CCH monitoring mode M2. The first CCH monitoring mode M1 may, e.g., be better suitable for eMBB and the second CCH monitoring mode M2 may be better suitable for URLLC or vice versa.

In some embodiments, the client device 100 may in the first CCH monitoring mode M1 be configured to perform CCH monitoring on a slot basis by monitoring a number of resources in a time slot and in the second CCH monitoring mode M2 be configured to perform CCH monitoring on a per span basis by monitoring a number of resources in a sub-slot.

The communication system 500 can in some embodiments be based on NR and/or LTE radio access technology (RAT). In such embodiments, the first CCH monitoring mode M1 may correspond to Rel-15 monitoring according to the 3GPP standard and the second CCH monitoring mode M2 may correspond to Rel-16 monitoring according to the 3GPP standard. However, the instant disclosure is not limited thereto.

If the client device 100 is capable of supporting multiple combinations of CCH monitoring according to the first CCH monitoring mode M1 and the second CCH monitoring mode M2, the network access node 300 would benefit from knowing which combinations the client device 100 can support. Some embodiments therefore introduce a new control message with which the client device 100 can indicate/inform the network access node 300 about its supported set of CCH monitoring capabilities. In this way, the network access node 300 and the client device 100 have the same understanding of the set of CCH monitoring capabilities supported by the client device 100.

According to some embodiments, the client device 100 can inform the network access node 300 about its CCH monitoring capabilities with a first control message 502. The client device 100 can transmit the first control message 502 to the network access node 300, as shown in FIG. 5. The first control message 502 indicates a set of CCH monitoring capabilities supported by the client device 100, where each CCH monitoring capability in the set of CCH monitoring capabilities indicates a first CCH monitoring capability for the first CCH monitoring mode M1 and a second CCH monitoring capability for the second CCH monitoring mode M2. Thus, the first control message 502 indicates different combinations of CCH monitoring according to the first CCH monitoring mode M1 and the second CCH monitoring mode M2 supported by the client device 100.

Based on the first control message 502, the network access node 300 can determine a CCH monitoring capability from the set of indicated CCH monitoring capabilities and configure the client device 100 with the determined CCH monitoring capability. The network access node 300 can, e.g., determine the CCH monitoring capability which is most suitable for a currently used communication service. Thereby, allowing the CCH monitoring to be adapted to the requirements of the communication service.

In some embodiments, the first CCH monitoring capability may be associated with a first number of serving cells and the second CCH monitoring capability may be associated with a second number of serving cells. Each CCH monitoring capability in the set of CCH monitoring capabilities may thus indicate a combination of the first number of serving cells and the second number of serving cells, i.e., a combination of the number of serving cells which the client device 100 is capable of monitoring in the first CCH monitoring mode M1 and in the second CCH monitoring mode M2, respectively, at the same time. Serving cells can herein further be understood to be cells, activated cells, component carriers, carriers, bandwidth parts, active bandwidth parts, etc.

One CCH monitoring capability may be indicated only by the first CCH monitoring capability and hence indicate the first number of serving cells which the client device 100 can monitor if the client device 100 only monitors in the first CCH monitoring mode M1. Another CCH monitoring capability may be indicated only by the second CCH monitoring capability and hence indicate the second number of serving cells which the client device 100 can monitor if the client device 100 only monitors in the second CCH monitoring mode M2. CCH monitoring capabilities indicating both the first CCH monitoring capability and the second CCH monitoring capability may indicate a combination of the number of serving cells which the client device 100 is capable of monitoring in the first CCH monitoring mode M1 and in the second CCH monitoring mode M2, respectively.

Figure 6:
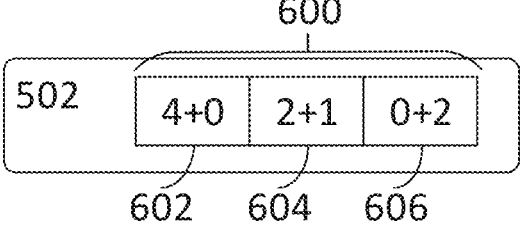
FIG. 6 illustrates a first control message according to at least one embodiment.

FIG. 6 illustrates the first control message 502 according to some embodiments where the first CCH monitoring capability is associated with a first number of serving cells and the second CCH monitoring capability is associated with a second number of serving cells. With reference to FIG. 6, the first control message 502 comprises a set of CCH monitoring capabilities 600 comprising three CCH monitoring capabilities 602, 604, and 606. The set of CCH monitoring capabilities 600 may, e.g., be comprised in one or more information elements in the first control message 502. Each CCH monitoring capability 602; 604; 606 in the set of CCH monitoring capabilities 600 indicates a first CCH monitoring capability for the first CCH monitoring mode M1 with a first number of serving cells and a second CCH monitoring capability for the second CCH monitoring mode M2 with a second number of serving cells. Thus, the set of CCH monitoring capabilities 600 shown in FIG. 6 indicates that the client device 100 can monitor the combinations: 4 serving cells in the first CCH monitoring mode M1 and 0 serving cells in the second CCH monitoring mode M2; 2 serving cells in the first CCH monitoring mode M1 and 1 serving cells in the second CCH monitoring mode M2; and 0 serving cells in the first CCH monitoring mode M1 and 2 serving cells in the second CCH monitoring mode M2.

According to some embodiments, a maximum number of CCH candidates and a maximum number of non-overlapping control channel elements (CCEs) per serving cell for CCH monitoring may be dependent on a combination of the first CCH monitoring capability and the second CCH monitoring capability. A CCH candidate may comprise a predefined combination of time and/or frequency resources on which a control message may be transmitted. The client device 100 checks, e.g., monitors or blind decodes, the combination of time and/or frequency resources for predefined downlink control information (DCI) formats. If the DCI formats have different sizes they may be counted as separate CCH candidates, if they have the same size they are counted as the same CCH candidate.

In some embodiments, the maximum number of CCH candidates and the maximum number of non-overlapping CCEs per serving cell can be adapted based on the combination of the first CCH monitoring capability and the second CCH monitoring capability for CCH monitoring. Thereby, allowing further flexibility in the CCH monitoring. For example, a first combination of the first CCH monitoring capability and the second CCH monitoring capability where the first number of serving cells is 2 and the second number of cells is 1 may be supported with a high maximum number of CCH candidates per serving cell, while a second combination of the first CCH monitoring capability and the second CCH monitoring capability where the first number of serving cells is 2 and the second number of cells is 2 may be supported when reducing the maximum number of CCH candidates per serving compared to the first combination.

The maximum number of CCH candidates and the maximum number of non-overlapping CCEs per serving cell mapping which can be used for a specific combination of the first CCH monitoring capability and the second CCH monitoring capability may in some embodiments be predefined (e.g. by a standard) and the mapping between them may be implemented in one or more tables. For example, one table per monitoring mode with two entries for each monitoring span combination and sub-carrier spacing may be used. Alternatively, two tables per monitoring mode may be used, where some CCH monitoring capability combinations are mapped to one table and other CCH monitoring capability combinations are mapped to another table.

Figure 7:
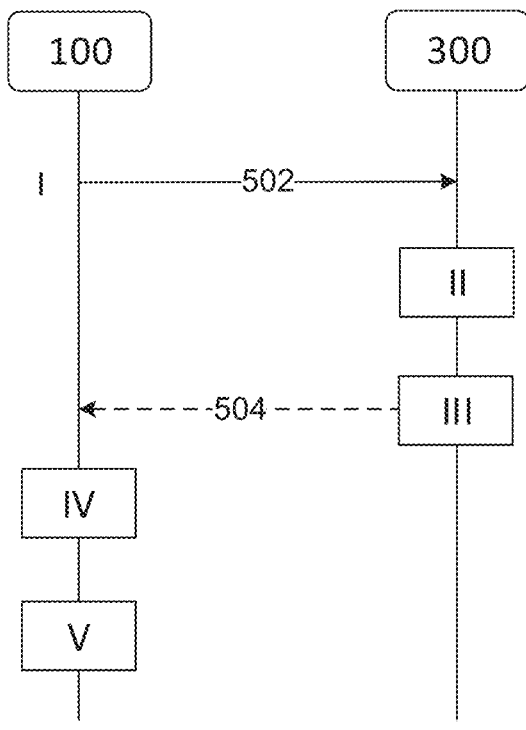
FIG. 7 illustrates signalling between a client device and a network access node according to at least one embodiment.

FIG. 7 illustrates control signalling between the network access node 300 and the client device 100 according to some embodiments. The signalling may be performed to adapt the CCH monitoring for carrier aggregation of the client device 100 depending on the use case and traffic scenarios.

In step I in FIG. 7, the client device 100 transmits a first control message 502 to the network access node 300. The first control message 502 indicates a set of CCH monitoring capabilities supported by the client device 100.

The set of CCH monitoring capabilities may be indicated in the first control message 502 in different ways. In some embodiments, the first control message 502 may explicitly indicate the set of CCH monitoring capabilities. The first control message 502 may, e.g., comprise an explicit indication of each CCH monitoring capability and hence each combination of the first number of serving cells and the second number of serving cells supported by the client device 100, as shown in FIG. 6.

The first control message 502 may further indicate the set of CCH monitoring capabilities with one or more indices, each index being associated with one or more CCH monitoring capabilities. The association between indices and CCH monitoring capabilities may, e.g., be predefined in a standard. When the network access node 300 receives one or more indices from the client device 100, the network access node 300 may thus derive the set of CCH monitoring capabilities from the receives one or more indices based on the predefined associations.

Furthermore, the first control message 502 may indicate the set of CCH monitoring capabilities with only each first CCH monitoring capability, only each second CCH monitoring capability and/or a single CCH monitoring capability.

When the first control message 502 indicates only each first CCH monitoring capability, the first control message 502 may indicate each first CCH monitoring capability directly or indirectly and each second CCH monitoring capability may be implicitly derived from the indicated first CCH monitoring capabilities. For example, the client device 100 may report the first CCH monitoring capabilities {4, 3, 2, 1, 0} and the associated second CCH monitoring capabilities, e.g., {0, 0, 0, 1, 2} or {0, 1, 2, 3, 4}, may be implicitly obtained by the network access node 300.

Which numbers to assume for the second CCH monitoring capabilities may be either fixed, e.g., always {0, 0, 0, 1, 2} in the example above, or it could be based on additional information from the client device 100. One client device 100 may indicate a low CCH monitoring capability to the network access node 300 meaning that {0, 0, 0, 1, 2} should be assumed, while another client device 100 may indicate a high capability meaning that {0, 1, 2, 3, 4} should be assumed.

The client device 100 may further report only each second CCH monitoring capability, e.g., {0, 1, 2}, which may imply that the first CCH monitoring capabilities {4, 2, 0} are supported, i.e., the CCH monitoring capability combinations {(4+0), (2+1), (0+2)} are supported. If the client device 100 reports the second CCH monitoring capabilities {4, 3, 2, 1, 0} then it may imply that the CCH monitoring capability combinations {(0+4), (1+3), (2+2), (3+1), (4+0)} are supported.

Furthermore, the client device 100 may report a maximum second CCH monitoring capability, i.e., the maximum number of second number of cells the client device 100 can support. A total CCH monitoring capability, i.e., a total number of serving cells for monitoring in both the first CCH monitoring mode M1 and the second CCH monitoring mode M2, may further be known or reported by the client device 100. In this case, the first CCH monitoring capabilities can be derived from the reported maximum second CCH monitoring capability and the total CCH monitoring capability. The client device 100 may further be assumed to support all lower numbers of second number of cells than the reported maximum number of second number of cells. In this example the first CCH monitoring mode M1 may be Rel-15 and the second CCH monitoring mode M2 may be Rel-16.

For example, the client device 100 may report a maximum second CCH monitoring capability of 3 serving cells. Supported second CCH monitoring capabilities may then be derived to be {0, 1, 2, 3}, and supported first CCH monitoring capabilities may be derived to be {4, 3, 2, 1}. Thus, the CCH monitoring capability combinations {(4+0), (3+1), (2+2), (1+3)} are supported.

When the first control message 502 indicates a single CCH monitoring capability, the network access node 300 may be able to derive other supported CCH monitoring capability in the set of supported CCH monitoring capabilities from the indicated single CCH monitoring capability. For example, if the client device 100 reports a first combination of the first CCH monitoring capability and the second CCH monitoring capability (0+2), the network access node 300 may implicitly assume that also a second combination of the first CCH monitoring capability and the second CCH monitoring capability, e.g., (2+1), is supported. If the client device 100 reports a combination for (number of cells in M1+number of cells in M2)=(0+4), it may imply that also the combinations {(1+3), (2+2), (3+1) and (4+0)} are supported. Further non-limiting examples are:

If the client device 100 reports {(4+0) and/or (0+2)}, the network access node 300 can assume that the combination (2+1) also is supported;

If the client device 100 reports (0+4), the network access node 300 can assume that combinations (4+0), (3+1), (2+2), (1+3) also are supported;

If the client device reports (0+2), the network access node 300 can assume that combination (4+0) and (2+1) also is supported; and If the client device 100 does not report anything, the network access node 300 can assume that certain minimum requirements are supported, non-limiting examples are:

{(4+0), (0+2)},
{(4+0), (0+2), (2+1)}, and
{(4+0), (3+1), (2+2), (1+3), (0+4)}.

The network access node 300 receives the first control message 502 from the client device indicating the set of CCH monitoring capabilities supported by the client device 100. Based on the first control message 502, the network access node 300 determines a CCH monitoring capability from the set of CCH monitoring capabilities for the client device 100 in step II in FIG. 7. Step II may comprise the network access node 300 determining the CCH monitoring capability based on the set of CCH monitoring capabilities and at least one of: cell load, supported number of carriers, supported services, and configured services for the client device 100. For example, when the client device 100 can support more carriers it can be configured with more carriers. Further, when, e.g., eMBB traffic load is higher more cells for the eMBB could be configured, and if URLLC requirements are demanding, more cells could be used for URLLC. Moreover, if the cell load is low more bandwidth can be given to the client device 100 which means that more carriers can be configured.

In step III in FIG. 7, the network access node 300 configures the client device 100 with the determined CCH monitoring capability. The network access node 300 may configure the client device 100 with the determined CCH monitoring capability by determining a set of cell configurations for the client device 100 and configure the client device 100 with the set of cell configurations for the client device 100. At least one cell configuration in the set of cell configurations comprises the first CCH monitoring mode M1 or the second CCH monitoring mode M2.

In some embodiments, the network access node 300 may explicitly configure the client device 100 with the determined CCH monitoring capability. In such embodiments, the configuring of the client device 100 with the determined CCH monitoring capability may further comprises the network access node 300 transmitting a second control message 504 to the client device 100, as indicated with the dashed arrow in FIG. 7. The second control message 504 indicates the determined CCH monitoring capability and may be any of: a radio resource control message, a medium access control channel element, or a downlink control information.

In step IV in FIG. 7, the client device 100 obtains a CCH monitoring capability from the set of CCH monitoring capabilities. The client device 100 may obtain the CCH monitoring capability explicitly from the network access node 300, i.e., client device 100 may be configured with the CCH monitoring capability by the network access node 300. The client device 100 may further determine the CCH monitoring capability internally, e.g., based on a set of predefined rules.

In some embodiments where the network access node 300 configures the client device 100 with the CCH monitoring capability, the client device 100 may obtain the CCH monitoring capability based on the second control message 504 transmitted by the network access node 300. Thus, the client device 100 may in some embodiments receive the second control message 504 from the network access node 300, and where the second control message 504 indicates the CCH monitoring capability from the set of CCH monitoring capabilities, i.e., the CCH monitoring capability determined by the network access node 300 in step II in FIG. 7. The client device 100 then obtains the CCH monitoring capability based on the second control message 504.

In some embodiments where the client device 100 determines the CCH monitoring capability, the obtaining of the CCH monitoring capability may comprise the client device 100 determining a set of cell configurations for the client device 100. At least one cell configuration in the set of cell configurations comprises the first CCH monitoring mode M1 or the second CCH monitoring mode M2. The client device 100 may further obtain the CCH monitoring capability based on the set of cell configurations for the client device 100. How the client device 100 may obtain the CCH monitoring capability based on the set of cell configurations will be further described below.

In step V in FIG. 7, the client device 100 performs CCH monitoring based on the obtained CCH monitoring capability, i.e., based on the CCH monitoring capability obtained step IV in FIG. 7.

According to some embodiments, the client device 100 may obtain the CCH monitoring capability from the set of cell configurations based on predetermined selection rules. Assume that the client device 100 supports the following combinations of the first CCH monitoring capability and the second CCH monitoring capability {(0+2), (2+1), (4+0)}. If the client device 100 is configured with a set of cell configurations comprising mixed cells, i.e., at least one of the configured cells is configured with the first monitoring mode M1 and at least one cell is configured with the second monitoring mode M2. Then, a CCH monitoring capability that supports mixed monitoring, i.e., (2+1) in this example, shall be used. If the client device 100 is only configured with cell configured with the second monitoring mode M2, the CCH monitoring capability that has the largest number of second number of cells, i.e., (0+2) in this example, shall be used. Furthermore, if the client device 100 is only configured with cell configured with the first monitoring mode M1, the CCH monitoring capability that has the largest number of the first number of cells, i.e., (4+0) in this example, shall be used.

Selection rules to select one CCH monitoring capability out of multiple CCH monitoring capabilities supporting combinations of the first CCH monitoring capability and the second CCH monitoring capability are further disclosed. Assume that the client device 100 can support the following CCH monitoring capabilities {(0+4), (1+3), (2+2), (3+1), (4+0)}. Then, the CCH monitoring capabilities supporting combinations of the first CCH monitoring capability and the second CCH monitoring capability are (1+3), (2+2), and (3+1). In case both cells with the first monitoring mode M1 and cells with the second monitoring mode M2 are configured, there are hence three possible CCH monitoring capability that could be selected, i.e., (3+1), (2+2), or (1+3). A selection rule to define which of the CCH monitoring capabilities to select in this case is needed. The selection rule may, e.g., be based on the actual number of configured cells with the first monitoring mode M1 and the second monitoring mode M2, respectively.

In some embodiments, selection rules may be defined such that the selection is based on the number of configured cells with the second monitoring mode M2. The CCH monitoring capability containing the largest number of the second CCH monitoring capability that does not exceed the number of configured cells with the second monitoring mode M2 may, e.g., be selected. For example, assume that 5 cells are configured with the second monitoring mode M2. Then, in the example above, the CCH monitoring capability (1+3) has the most cells with the second CCH monitoring capability and should be selected. If only 2 cells are configured with the second monitoring mode M2, the CCH monitoring capability (2+2) should be selected. Furthermore, if only one cell is configured with the second monitoring mode M2, the CCH monitoring capability (3+1) should be selected.

In some embodiments, selection rules may be defined such that the selection is based on the number of configured cells with the first monitoring mode M1. The CCH monitoring capability containing the largest number of the first CCH monitoring capability that does not exceed the number of configured cells with the first monitoring mode M1 may, e.g., be selected. Then, out of the CCH monitoring capabilities {(1+3), (2+2), (3+1), (3+1)}, the CCH monitoring capability (3+1) should be selected. If 2 cells are configured with the first monitoring mode M1, the CCH monitoring capability (2+2) should be selected, and if only 1 cell is configured with the first monitoring mode M1, then the CCH monitoring capability (1+3) capability should be selected.

The above described selection rules are non-limiting examples of selection rules that the client device 100 can use to obtain the CCH monitoring capability. Other selection rules may be defined without deviating from the scope of the instant disclosure.

In NR the maximum number of monitored PDCCH candidates per cell and per monitoring span is dependent on applied Rel-15/Rel-16 capability combination. If, e.g., the applied combination is {0 Rel-15, 2 Rel-16} then M_max for Rel-16 CCH monitoring is equal to N1; and if the applied combination is {3 Rel-15, 1 Rel-16}, then M_max is equal to N2.

Consider the following example for CCE monitoring when different CCH monitoring capabilities are applied. This example is for illustrative purposes only and not limited to CCEs. A similar example can also be given for monitoring the maximum number of PDCCH candidates. It is further to be noted that 3GPP terminology and system design is used for providing deeper understanding of the examples but are not limited thereto. Therefore, the client device can be considered as a UE in this context.

Assume that the UE can support the following two capability combinations of Rel-15/Rel-16 monitoring: {(1 Rel-15, 3 Rel-16), (3 Rel-15, 1 Rel-16)}. Further, assume that the UE is configured with 3 cells in Rel-15 monitoring mode and with 3 cells in Rel-16 monitoring mode. For the cells with Rel-15 monitoring, sub-carrier spacing 60 kHz (i.e., $\mu=2$) is used. For the cells with Rel-16 monitoring, sub-carrier spacing 15 kHz (i.e., $\mu=0$) and the span pattern (7, 3) are used. The configuration can be performed, e.g., according to TS 38.213 Section 10.

If the PDCCH monitoring capability (1+3) for PDCCH monitoring shall be followed, then for Rel-16 monitoring, the UE is configured according to its capability. In this case it is expected to monitor a maximum number of 56 non-overlapping CCEs in each monitoring span of each cell. In total, the UE is expected to be able to monitor 3*56=168 non-overlapping CCEs per span over all 3 Rel-16 cells. For the Rel-15 monitoring, the UE is configured with 3 cells but only has PDCCH monitoring capability for one cell. This is not an error case, but the UE has to scale the total number of non-overlapping CCEs that are monitored according to Rel-15. From TS 38.213, Section 10, it can then be concluded that the UE is required to be able to monitor in total $$C_{PDCCH}^{total,slot,2} = 48$$

non-overlapping CCEs per slot across all Rel-15 cells.

If, on the other hand, capability (3+1) shall be followed, the UE only has a capability of one cell for Rel-16 monitoring but is configured with 3 Rel-16 cells. Thus, the UE is configured above its capability for Rel-16 monitoring. The UE has to perform scaling of the maximum number of non-overlapping CCEs. According to TS 38.213, the value $$C_{PDCCH}^{total,(7,3),0} = 56$$

17

18 can then be calculated. It represents the total maximum number of non-overlapping CCEs per span that the UE has to be able to monitor across all configured Rel-16 cells. For the Rel-15 based monitoring, the UE is configured according to its capability and is expected to monitor a maximum number of $$C_{PDCCH}^{max,slot,2} = 48$$

non-overlapping CCEs per slot and per cell and in total $$3 * C_{PDCCH}^{max,slot,2} = 144$$

non-overlapping CCEs per slot across all cells.

These calculations are summarized in Table 1 below. They show that for the same carrier aggregation configuration (3 cells according to Rel-15 and 3 cells according to Rel-16), the PDCCH monitoring is very different depending on the applied capability. It is therefore beneficial to adapt the PDCCH monitoring capability to the requirements of a given use case and it is crucial that the network and UE have the same understanding which capability that shall be applied.

TABLE 1

Maximum number of required CCEs to be monitored across the configured cells.

| N-cap. 16 3 cells | | | | |
|---|---|---|---|---|
| SCS | (X, Y) | #cells | C_max/span | C_total/span (TS 38.213) |
| 15 kHz | (7, 3) | 3 | 56 | (3 * 56 * 3)/3 = 168 |
| N-cap, 15 1 cells | | | | |
| SCS | (X, Y) | #cells | C_max/span | C_total/slot (TS 38.213) |
| 60 kHz | n.a. | 3 | 48 | (1 * 48 * 3)/3 = 48 |
| N-cap. 16 1 | | | | |
| SCS | (X, Y) | #cells | C_max/span | C_total/span (TS 38.213) |
| 15 kHz | (7, 3) | 3 | 56 | (1 * 56 * 3)/3 = 56 |
| N-cap, 15 3 | | | | |
| SCS | (χ, Y) | #cells | C_max/span | C_total/slot (TS 38.213) |
| 60 kHz | n.a. | 3 | 48 | (3 * 48 * 3)/3 = 144 |

In some embodiments, the client device 100 in some cases does not signal or transmit the first control message 502 to the network access node 300, hence refrain from transmitting the first control message 502. In such cases the network access node 300, and hence the network, derives the CCH monitoring capabilities supported by the client device 100 from a predefined set of CCH monitoring capabilities. The predefined set may be given by the standards such as Rel-15, Rel-16, etc.

The client device 100 may therefore refrain from, or in other words, does not transmit the first control message 502 to the network access node 300 when the client device 100 only supports a required/default minimum set of CCH monitoring capabilities. Other non-limiting examples of relevant conditions are: when for a service type it is not required to report carrier aggregation capability; and when the network conditions, e.g., the supported number of frequency bands and/or bandwidth parts, do not require or preclude the application of advanced CCH (such as PDCCH) monitoring capabilities.

Therefore, the client device 100 may be configured to refrain from transmitting the first control message 502 to the network access node 100 upon one or more of the following conditions are fulfilled, i.e.:

when the client device 100 only supports a required/default minimum set of CCH monitoring capabilities;

when for a service type the client device 100 is not required to report carrier aggregation capability; and when network conditions do not require and/or preclude the application of advanced monitoring capabilities.

The network conditions may be at least one of supported number of frequency bands and supported number of bandwidth parts.

Correspondingly, the network access node 100 may be configured to deduce/derive the CCH monitoring capabilities of the client device 100 upon not receiving the first control message 502 based on a predefined set of CCH monitoring capabilities.

Corresponding methods in the client device 100 and the network access node 100 are also considered herein.

The client device 100 in this disclosure includes but is not limited to: a UE such as a smart phone, a cellular phone, a cordless phone, a session initiation protocol (SIP) phone, a wireless local loop (WLL) station, a personal digital assistant (PDA), a handheld device having a communication function, a computing device or another processing device connected to a wireless modem, an in-vehicle device, a wearable device, an integrated access and backhaul node (IAB) such as mobile car or equipment installed in a car, a drone, a device-to-device (D2D) device, a wireless camera, a mobile station, an access terminal, an user unit, a communication device, a station of wireless local access network (WLAN), a wireless enabled tablet computer, a laptop-embedded equipment, an universal serial bus (USB) dongle, a wireless customer-premises equipment (CPE), and/or a chipset. In an Internet of things (IOT) scenario, the client device 100 may represent a machine or another device or chipset which performs communication with another wireless device and/or a network equipment.

The UE may further be referred to as a mobile telephone, a cellular telephone, a computer tablet or laptop with wireless capability. The UE in this context may, e.g., be portable, pocket-storable, hand-held, computer-comprised, or vehicle-mounted mobile device, enabled to communicate voice and/or data, via the radio access network, with another entity, such as another receiver or a server. The UE can be a station (STA), which is any device that contains an IEEE 802.11-conformant media access control (MAC) and physical layer (PHY) interface to the wireless medium (WM). The UE may also be configured for communication in 3GPP related LTE and LTE-Advanced, in WiMAX and its evolution, and in fifth generation wireless technologies, such as NR.

The network access node 300 in this disclosure includes but is not limited to: a NodeB in wideband code division multiple access (WCDMA) system, an evolutional Node B (eNB) or an evolved NodeB (eNodeB) in LTE systems, or a relay node or an access port, or an in-vehicle device, a wearable device, or a gNB in the fifth generation (5G) networks. Further, the network access node 300 herein may be denoted as a radio network access node, an access network access node, an access port, or a base station, e.g., a radio base station (RBS), which in some networks may be referred to as transmitter, "gNB", "gNodeB", "eNB", "eNodeB", "NodeB" or "B node", depending on the technology and terminology used. The radio network access nodes may be of different classes such as, e.g., macro eNodeB, home eNodeB or pico base station, based on transmission power and thereby also cell size. The radio network access node can be a station (STA), which is any device that contains an IEEE 802.11-conformant MAC and PHY interface to the wireless medium. The radio network access node may also be a base station corresponding to the 5G wireless systems.

Furthermore, any method according to some embodiments may be implemented in a computer program, having code means, which when run by processing means causes the processing means to execute the steps of the method. The computer program is included in a non-transitory computer readable medium of a computer program product. The computer readable medium may comprise any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that some embodiments of the client device 100 and the network access node 300 comprise the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the client device 100 and the network access node 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the instant disclosure is not limited to the embodiments described above, but also relates to and incorporates all embodiments within the scope of the appended claims.

The invention claimed is:

1. A client device for a communication system, the client device comprising:
a transceiver configured to transmit a first control message to a network access node,
wherein the first control message indicates a set of control channel (CCH) monitoring capabilities supported by the client device,
wherein each CCH monitoring capability in the set of CCH monitoring capabilities indicates a combination of:

a first CCH monitoring capability associated with a first number of serving cells monitorable by the client device in a first CCH monitoring mode, and
a second CCH monitoring capability associated with a second number of serving cells monitorable by the client device in a second CCH monitoring mode; and
wherein, for each CCH monitoring capability in the set of CCH monitoring capabilities, a maximum number of CCH candidates and a maximum number of non-overlapping control channel elements (CCEs) per serving cell for CCH monitoring are dependent on the combination of the first CCH monitoring capability and the second CCH monitoring capability,
in the first CCH monitoring mode, the maximum number of CCH candidates and the maximum number of CCEs per serving cell for CCH monitoring are for per slot, and
in the second CCH monitoring mode, the maximum number of CCH candidates and the maximum number of CCEs per serving cell for CCH monitoring are for per span.

2. The client device according to claim 1, wherein the first control message indicates:
explicitly the set of CCH monitoring capabilities.

3. The client device according to claim 1, further comprising a processor configured to:
obtain a CCH monitoring capability to be used for CCH monitoring from the set of CCH monitoring capabilities; and
perform CCH monitoring based on the obtained CCH monitoring capability.

4. The client device according to claim 3, wherein:
the transceiver is configured to receive a second control message from the network access node, wherein the second control message indicates the CCH monitoring capability to be used for CCH monitoring; and
the processor is configured to obtain the CCH monitoring capability to be used for CCH monitoring based on the second control message.

5. The client device according to claim 4, wherein the second control message is any of: a radio resource control message, a medium access control channel element, or a downlink control information.

6. The client device according to claim 3, wherein the processor is configured to:
determine a set of cell configurations for the client device, wherein at least one cell configuration in the set of cell configurations comprises the first CCH monitoring mode or the second CCH monitoring mode; and
obtain the CCH monitoring capability to be used for CCH monitoring based on the set of cell configurations for the client device.

7. A network access node for a communication system, the network access node comprising:
a transceiver configured to receive a first control message from a client device,
wherein the first control message indicates a set of control channel (CCH) monitoring capabilities supported by the client device, and
wherein each CCH monitoring capability in the set of CCH monitoring capabilities indicates a combination of:
a first CCH monitoring capability associated with a first number of serving cells monitorable by the client device in a first CCH monitoring mode, and a second CCH monitoring capability associated with a second number of serving cells monitorable by the client device in a second CCH monitoring mode; and a processor configured to:

determine a CCH monitoring capability to be used for CCH monitoring from the set of CCH monitoring capabilities for the client device based on the first control message; and configure the client device with the determined CCH monitoring capability, wherein, for each CCH monitoring capability in the set of CCH monitoring capabilities, a maximum number of CCH candidates and a maximum number of non-overlapping control channel elements (CCEs) per serving cell for CCH monitoring are dependent on the combination of the first CCH monitoring capability and the second CCH monitoring capability, in the first CCH monitoring mode, the maximum number of CCH candidates and the maximum number of CCEs per serving cell for CCH monitoring are for per slot, and in the second CCH monitoring mode, the maximum number of CCH candidates and the maximum number of CCEs per serving cell for CCH monitoring are for per span.

8. The network access node according to claim 7, wherein the first control message indicates:

explicitly the set of CCH monitoring capabilities.

9. The network access node according to claim 7, wherein the processor is configured to determine the CCH monitoring capability to be used for CCH monitoring based on:

the set of CCH monitoring capabilities, and at least one of: cell load, supported number of carriers, supported services, or configured services for the client device.

10. The network access node according to claim 7, wherein the transceiver is configured to transmit a second control message to the client device, wherein the second control message indicates the determined CCH monitoring capability.

11. The network access node according to claim 10, wherein the second control message is any of: a radio resource control message, a medium access control channel element, or a downlink control information.

12. The network access node according to claim 7, wherein, to configure the client device with the determined CCH monitoring capability, the processor is configured to:

determine a set of cell configurations for the client device, wherein at least one cell configuration in the set of cell configurations comprises the first CCH monitoring mode or the second CCH monitoring mode; and configure the client device based on the set of cell configurations for the client device.

13. A method for a client device in a communication system, the method comprising:

transmitting, by the client device, a first control message to a network access node, wherein the first control message indicates a set of control channel (CCH) monitoring capabilities supported by the client device, wherein each CCH monitoring capability in the set of CCH monitoring capabilities indicates a combination of:

a first CCH monitoring capability associated with a first number of serving cells monitorable by the client device in a first CCH monitoring mode, and a second CCH monitoring capability associated with a second number of serving cells monitorable by the client device in a second CCH monitoring mode, and wherein, for each CCH monitoring capability in the set of CCH monitoring capabilities, a maximum number of CCH candidates and a maximum number of non-overlapping control channel elements (CCEs) per serving cell for CCH monitoring are dependent on the combination of the first CCH monitoring capability and the second CCH monitoring capability, in the first CCH monitoring mode, the maximum number of CCH candidates and the maximum number of CCEs per serving cell for CCH monitoring are for per slot, and in the second CCH monitoring mode, the maximum number of CCH candidates and the maximum number of CCEs per serving cell for CCH monitoring are for per span.

14. A method for a network access node in a communication system, the method comprising:

receiving, by the network access node, a first control message from a client device, wherein the first control message indicates a set of control channel (CCH) monitoring capabilities supported by the client device, and wherein each CCH monitoring capability in the set of CCH monitoring capabilities indicates a combination of:

a first CCH monitoring capability associated with a first number of serving cells monitorable by the client device in a first CCH monitoring mode, and a second CCH monitoring capability associated with a second number of serving cells monitorable by the client device in a second CCH monitoring mode;

determining, by the network access node, a CCH monitoring capability to be used for CCH monitoring from the set of CCH monitoring capabilities for the client device based on the first control message; and configuring, by the network access node, the client device with the determined CCH monitoring capability, wherein, for each CCH monitoring capability in the set of CCH monitoring capabilities, a maximum number of CCH candidates and a maximum number of non-overlapping control channel elements (CCEs) per serving cell for CCH monitoring are dependent on the combination of the first CCH monitoring capability and the second CCH monitoring capability, in the first CCH monitoring mode, the maximum number of CCH candidates and the maximum number of CCEs per serving cell for CCH monitoring are for per slot, and in the second CCH monitoring mode, the maximum number of CCH candidates and the maximum number of CCEs per serving cell for CCH monitoring are for per span.

15. A computer program product, comprising a non-transitory computer readable medium containing a computer program executable by a computer to cause the computer to perform:

transmitting a first control message to a network access node, wherein the first control message indicates a set of control channel (CCH) monitoring capabilities supported by a client device, wherein each CCH monitoring capability in the set of CCH monitoring capabilities indicates a combination of:

a first CCH monitoring capability associated with a first number of serving cells monitorable by the client device in a first CCH monitoring mode, and a second CCH monitoring capability associated with a second number of serving cells monitorable by the client device in a second CCH monitoring mode; and wherein, for each CCH monitoring capability in the set of CCH monitoring capabilities, a maximum number of CCH candidates and a maximum number of non-overlapping control channel elements (CCEs) per serving cell for CCH monitoring are dependent on the combination of the first CCH monitoring capability and the second CCH monitoring capability, in the first CCH monitoring mode, the maximum number of CCH candidates and the maximum number of CCEs per serving cell for CCH monitoring are for per slot, and in the second CCH monitoring mode, the maximum number of CCH candidates and the maximum number of CCEs per serving cell for CCH monitoring are for per span.

16. A computer program product, comprising a non-transitory computer readable medium containing a computer program executable by a computer to cause the computer to perform:

receiving a first control message from a client device, wherein the first control message indicates a set of control channel (CCH) monitoring capabilities supported by the client device, and wherein each CCH monitoring capability in the set of CCH monitoring capabilities indicates a combination of:

a first CCH monitoring capability associated with a first number of serving cells monitorable by the client device in a first CCH monitoring mode, and a second CCH monitoring capability associated with a second number of serving cells monitorable by the client device in a second CCH monitoring mode;

determining a CCH monitoring capability to be used for CCH monitoring from the set of CCH monitoring capabilities for the client device based on the first control message; and configuring the client device with the determined CCH monitoring capability, wherein, for each CCH monitoring capability in the set of CCH monitoring capabilities, a maximum number of CCH candidates and a maximum number of non-overlapping control channel elements (CCEs) per serving cell for CCH monitoring are dependent on the combination of the first CCH monitoring capability and the second CCH monitoring capability, in the first CCH monitoring mode, the maximum number of CCH candidates and the maximum number of CCEs per serving cell for CCH monitoring are for per slot, and in the second CCH monitoring mode, the maximum number of CCH candidates and the maximum number of CCEs per serving cell for CCH monitoring are for per span.

17. The client device according to claim 1, wherein for each CCH monitoring capability indicating the combination of the first CCH monitoring capability and the second CCH monitoring capability, only the first CCH monitoring capability is indicated, with the second CCH monitoring capability being implicitly derived from the indicated first CCH monitoring capability, or only the second CCH monitoring capability is indicated, with the first CCH monitoring capability being implicitly derived from the indicated second CCH monitoring capability.

18. The network access node according to claim 7, wherein the first control message indicates:

multiple indices, each of which is associated with one or more CCH monitoring capabilities in the set of CCH monitoring capabilities.

* * * * *